United States Patent [19]
Hayashi

[11] 3,821,452
[45] June 28, 1974

[54] PROCESS FOR THE CONTINUOUS PRODUCTION OF MULTI-LAYERED FOOD MATERIAL

[76] Inventor: Torahiko Hayashi, 2-3 Nozawa-cho, Utsunomiya, Japan

[22] Filed: Feb. 19, 1971

[21] Appl. No.: 116,895

[30] Foreign Application Priority Data
Feb. 24, 1970 Japan.............................. 45-15254

[52] U.S. Cl.................. 426/502, 425/364, 425/328, 425/302, 426/283, 426/344
[51] Int. Cl............................................. A21d 13/08
[58] Field of Search.......... 99/92, 86; 425/168, 364, 425/366, 302, 289; 100/222

[56] References Cited
UNITED STATES PATENTS
| | | | |
|---|---|---|---|
| 2,642,013 | 6/1953 | Enoch............................ | 100/222 X |
| 2,907,285 | 10/1959 | Anetsberger........................ | 425/364 |
| 3,494,302 | 2/1970 | Wolf et al............................. | 99/92 |

*Primary Examiner*—Raymond N. Jones
*Attorney, Agent, or Firm*—Eliot S. Gerber

[57] ABSTRACT

A process for the continuous production of multilayered food material, which consists substantially in feeding a dough of uniform thickness which covers fat, paste or other inner material onto a movable base. The base is located beneath a press, which compresses the fed materials into a predetermined thickness. The press is actuated in synchronization with the feed of the materials and the movement of the base is variable as to its velocity.

7 Claims, 5 Drawing Figures

PATENTED JUN 28 1974　　　　　　　　　　3,821,452

INVENTOR.
TORAHIKO HAYASHI
BY Elsie S. Gerber
ATTORNEY

INVENTOR.
TORAHIKO HAYASHI
BY
Eliot S. Gerber
ATTORNEY.

PATENTED JUN 28 1974 3,821,452

INVENTOR.
TORAHIKO HAYASHI
BY
Elise S. Gerber
ATTORNEY

PROCESS FOR THE CONTINUOUS PRODUCTION OF MULTI-LAYERED FOOD MATERIAL

The present invention relates to a process and device for the manufacture of multilayered food material. More particularly, it relates to a process and device for the continual manufacture of multilayered food material, such as pies, Danish pastries and sweet rolls, which contain many layers of fat, paste or other inner material between layers of kneaded dough of cereals.

Danish pastries and pies, among others, contain approximately 40 layers or more of fat between layers of dough and yet the entire thickness is only about 5 to 10 mm. The conventional method for manufacturing such food materials consists mainly in preparing layers of stretched dough containing in-between a thin layer of paste, stretching again the three-layered material with a roller, folding it into three folds, and then repeating several times this process of stretching and folding. The process requires a great deal of labor and time, thus increasing the cost of the products. The present invention provides a process and a device which is devoid of such disadvantages and is capable of manufacturing multilayered food material automatically and economically.

The material used for the present invention is a cubic material encrusting an inner material such as fat, custard, jelly and other food material with a dough of cereals. The present invention provides a process and a device for the continual manufacture of food material consisting of layers of dough and layers of inner material, each layer of both overlapping each other by means of feeding continuously the material at a predetermined span of time onto a movable base, typically consisting of a conveyor belt as a main component, and compressing the material on the base with a press above the base, the movement of the press being synchronized with the feed of the material.

A further feature of the present invention lies in manufacturing the multilayered food material by regulating the movement of the base. A continuous strip of the multi-layered food material can be manufactured if the movement of the base is continuously maintained and the distance of the movement is adjusted to be a half or less of the diameter of the compressed material for each interval of time between the feeding of a material and the feeding of a subsequent material. Again, a multilayered food material of which the horizontal cross-section is circular can be manufactured if the base is stopped for a predetermined number of times at which materials are fed and synchronized compressions are employed before the base is moved for the discharge of the compressed material.

The device of the present invention comprises as its further features an endless belt which is supported and rotatable by a pair of rollers and a portion of which is positioned on the upper surface of a cradle which receives the pressing motion of the press when the latter is actuated to compress the fed material on the belt, and a second belt mechanism of a similar construction adjacent to the first belt mechanism on the path of the compressed material forwarded by the first belt, said second belt being equipped with a press roller positioned immediately above one of the rollers incorporated in the second belt to perform a second press operation in cooperation with the latter roller.

A still further feature of the present invention may be means to adjust and vary the respective speed of each compressed material conveying device. Such means make it possible to adjust and vary the number of layers of the formed material as desired.

An object of the present invention is thus to provide a process and device for continuously manufacturing a multilayered food material in an automatic and economical manner.

Further objects and features of the present invention will be apparent from the following description of the embodiments of the present invention together with the accompanying drawing.

Figure 1:
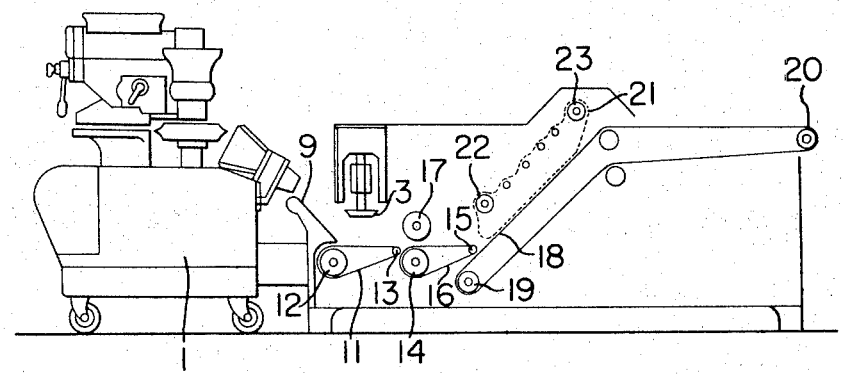
FIG. 1 is a schematic side view of an embodiment of the present invention.
Figure 3:
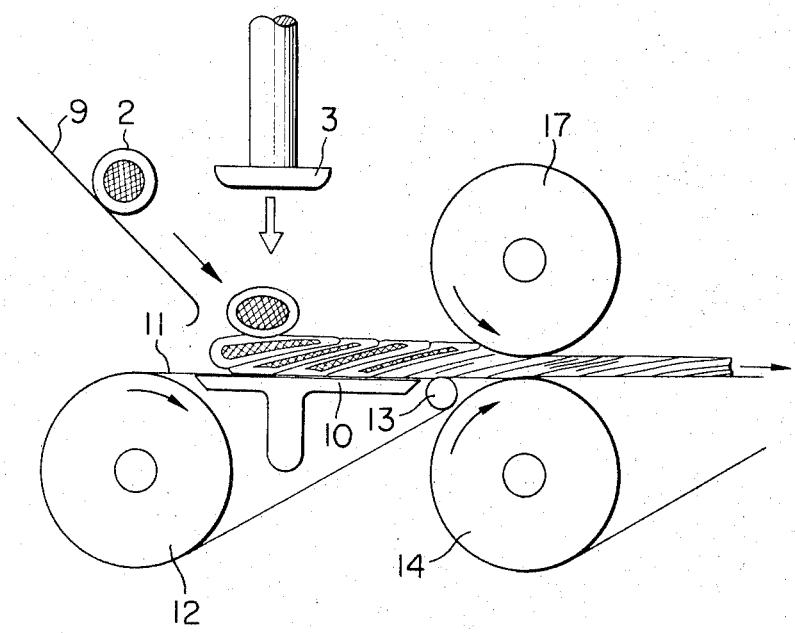
FIG. 3 is a side view showing the operation in forming a multilayered food material in an embodiment.

In FIG. 1, the numeral 1 indicates an encrusting machine, which encrusts butter, pastes and other inner material with dough, and is an embodiment of, U.S. Pat. No. 3,615,147 and U.S. Pat. No. 3,572,259, all owned by the inventor. The encrusting machine 1 is capable of continuously producing each second one relatively small cubic piece of finished material 2, as shown in FIG. 3, of 80 g ~ 150 g, which consists of butter, pastes and other inner material wrapped up with dough. Further explanation of the encrusting machine 1 is omitted here, since it is not a requirement in this invention to employ the same machine. Any means may be used under the invention so long as such means is capable of continuously producing the materials 2 as described above.

Figure 2:
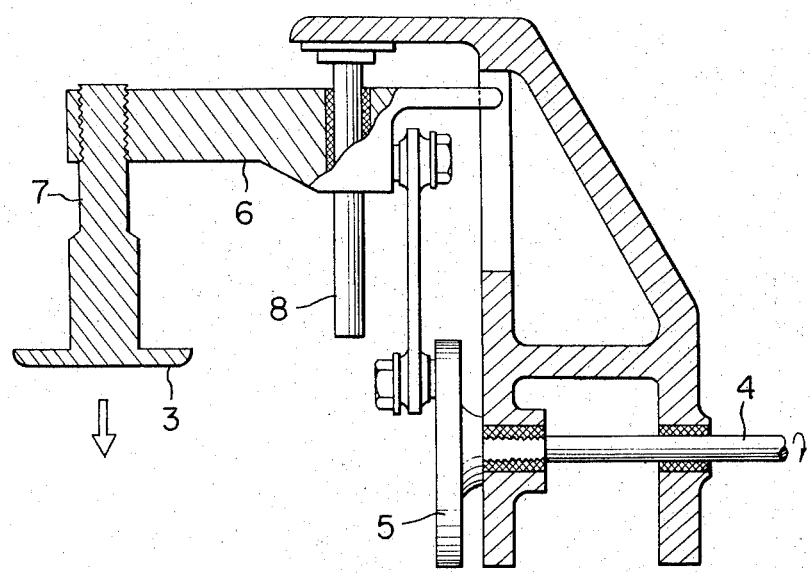
FIG. 2 is a cross-sectional side view showing the press mechanism in an embodiment of the present invention.

A press 3 compresses and flattens the material 2 fed from the encrusting device into a predetermined thickness, and is connected integrally to the bottom portion of a shaft 7 as indicated in FIG. 2, which in turn is connected to an arm 6. The arm 6 is arranged to repeat upward and downward motions by means of a crank 5 connected to an input shaft 4. A guide post 8 prevents the shaft 7 from fluttering. The input for the press 3 is preferably taken from the encrusting machine 1, and the press 3 is arranged to be actuated in full synchronization with the feed of the material 2.

A guide chute 9 seen in FIG. 1 and FIG. 3 leads the material 2 discharged from the encrusting machine 1 to a position underneath the press 3. Immediately below the press 3 a first belt 11, which is adjustable as to velocity and which can be stopped as desired, runs horizontally, in the direction away from the chute 9, on the upper surface of a receiving block 10. A first driving roller 12, which is rotatable clockwise in FIG. 3, drives the first belt 11, which is supported by and rotatable around said driving roller 12 and a small roller 13 and delivers the material to a subsequent station. A second driving roller 14 is positioned adjacent to the small roller 13 on its right side in FIGS. 1 and 3, and drives a second belt 16, which passes around said roller 14 and a small roller 15. The axis of the upper surface of the second belt 16 is positioned on the extension of the surface of the first belt 11, both being aligned at the same height. A press roller 17 is positioned immediately above the second driving roller 14, and the two rollers are spaced at a predetermined distance from each other. Both rollers 14 and 17 rotate in opposite directions, the rotation of roller 14 being clockwise and that of roller 17 being counterclockwise in FIG. 3, thus compressing further the incoming material and flattening its surface.

A third belt 18 may be provided adjacent to the small roller 15, being vertically aligned with the first belt 11 and the second belt 16 on their right side in FIG. 1. A portion of the third belt 18 slopes upward from substantially the level of the first and the second belts, and the remaining portion starts at the uppermost level of the slope and remains horizontal. The third belt 18 is driven by rollers 19 and 20, respectively rotating clockwise in FIG. 1. A chain belt 21 is positioned above the slope of the third belt 18 and is driven by rollers 22 and 23, which rotate counterclockwise in FIG. 1. The chain belt 21 is arranged to move at the same speed as the third belt 18. The lower portion of the chain belt 21 hangs loosely on the third belt 18 and lightly holds the material coming from the second belt 16 onto the third belt 18 so that the material will not slip down from the upward slope.

It is desirable that the first through the third belts stand in a relationship wherein the velocity increases gradually from the first to the third. This will make easier the further delivery of the material compressed and stretched by the press roller 17 and will prevent the slackening of the compressed material. Again, it is desirable to have a device which can freely regulate the speeds of these conveyors. Such will not only help adapt to a variety of different production conditions, but also regulate and vary the number of layers in the formed material as desired.

As for the operation of the device in the present invention, when it is actuated together with the encrusting machine 1, a cubic material 2, which is produced by the encrusting machine 1 and which consists of fat and other material enwrapped with dough, rolling down the chute 9, comes to a position on the first belt 11 and under the press 3. The press 3 comes down at a time prearranged relative to the feed of the material 2 and compresses the material 2 on the first belt 11 which material is supported by the receiver 10 to a predetermined thickness. In an embodiment of the present invention, the first belt 11 moves at such a speed that the compressed material is delivered only a distance of a half of its diameter or less before the second material 2 is fed onto the first belt 11 under the press 3. The second material 2, therefore, drops onto a portion of the upper surface of the compressed first material 2 a little way in back of its center and is compressed at that position. A material 2 which follows the preceding materials drops onto a position slightly behind the center of the second material 2 and is compressed so as to produce a combination of the three materials compressed together, and provide plurality of layers. If this operation is repeated further, we can obtain an overlapping of the materials; the number of layers will be the quotient of the diameter of the compressed material 2 divided by the length of the movement of the first belt 11 during a span of time between the feeding of the first material and the feeding of the second material. The number of layers can be freely adjusted by the means used to adjust the speed of the belt. The material thus obtained is provided with layers which are continuous, and a strip of such material with continuous layers can be obtained without interruption. Since each material fed contains an inner material such as fat and pastes, the obtained strip of compressed material contains a number of continuous layers of the inner material which is the same as the number of layers. An experiment has indicated that the strip of material formed by the first belt 11 and the press 3 only, without the subsequent devices, has an uneaven upper surface caused by the portion of material along the rim of the press being displaced by the motion of the press, and that the smoothing out by a subsequent roller can produce material suited for commercial purposes. The press roller 17 positioned immediately above the second driving roller 14 serves this requirement. The flattened material with a smoothed surface is then carried by the second belt 16 onto the third belt 18, the first portion of which brings the material up the slope to a level which will facilitate easy handling of the material for further treatments such as cutting and makeups.

Figure 4:
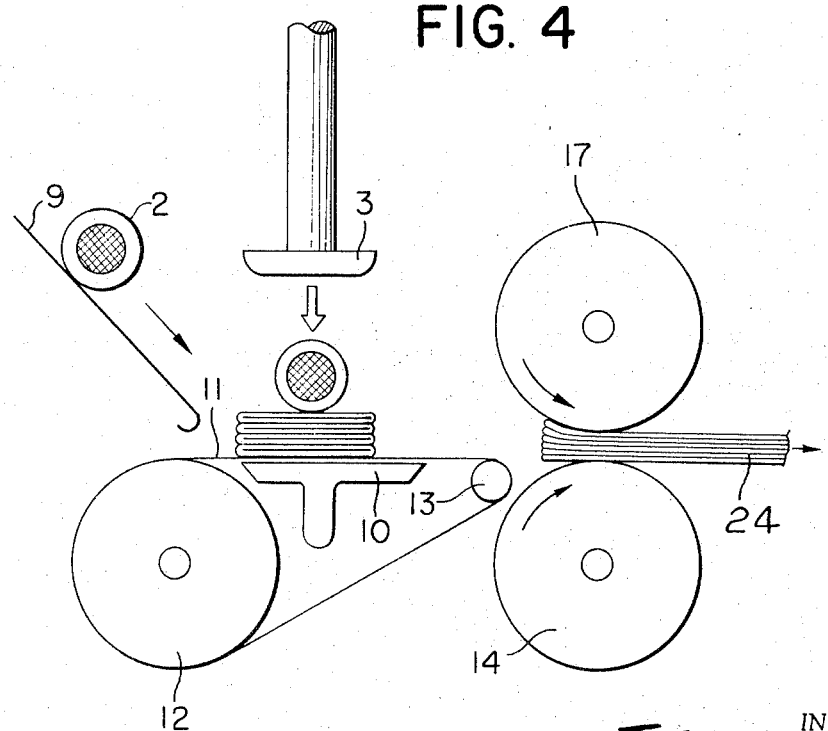
FIG. 4 is a similar view in another embodiment.

In a different embodiment of the present invention, as indicated in FIG. 4, the operations of the encrusting machine 1 and the press 3 remain the same, but the belt 11 is arranged to move intermittently. When the belt 11 is stationary, a desired number of materials 2 is fed and stamped at substantially the same spot. A first material delivered on the belt 11 is compressed by the motion of the press 3. A second material is fed to a position immediately above the center of the flattened first material. The second material is then flattened by the press 3 in the same manner as the first material so that the first and the second materials pile up in two layers. These operations will be repeated as predetermined to obtain a desired multilayered material 24. The belt 11 will then be actuated to deliver the manufactured multilayered material to a further station. In this embodiment, the speed of the delivery is regulated so that the material 2 fed subsequently may not overlap the manufactured multilayered material. The subsequent manufactures of the multilayered materials will follow continuously without interfering the continuous operations of the encrusting machine 1 and the press 3.

Figure 5:
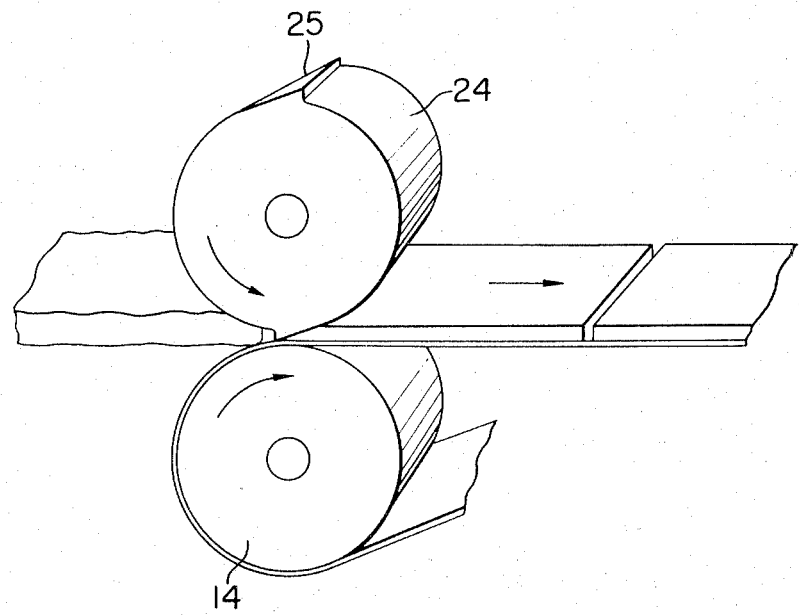
FIG. 5 is a perspective view showing a modification of a press roller.

In a still further embodiment of the present invention, a press roller may be provided with one or more cutter teeth. If the formed strip of material is to be separated for further processing by cutting it along a line perpendicular to the axis of the strip of material, a cutter may be advantageously provided on the surface of the press roller parallel to its axis. FIG. 5 indicates a press roller 24 with two cutter teeth 25. The cutter tooth 25 is substantially triangular in cross-section defined by a line tangent to the periphery of the roller and a line directed to the center of the roller. As indicated in the drawing, the above tangent line approaches the periphery from the rear relative to the direction of the rotation of the press roller. The cutter tooth of this shape enables the cutting operation to be performed without impairing the function of the roller 24 as a press roller.

In still another embodiment, a piece of formed material cut to a predetermined length by the press roller may be rolled up in a convolute form on the third belt 18 working on the material in cooperation with the chain belt 21. In case the third belt 18 carrying the cut piece of material is moved at a certain speed and the chain belt 21 hanging on the third belt 18 is kept stationary, the forward end of the formed material will be raised by the lowest rear end of the chain belt 21 and be rolled back on the adjacent backward portion of the material. The chain belt 21, along with the advance of the third belt 18, will thus roll up the material continuously and the completed roll in the shape of a bar will then be forwarded up the slope in a rolling motion.

According to an experiment, 150 g cubic materials encrusting butter with dough in the proportions of one part butter to two parts dough were fed into the device of the present invention, at the speed of one per second. The speed of the first belt 11 was set at 3 mm per second. By merely compressing the materials on the belt at intervals correlating to the feed of the materials, a strip of material containing approximately 90 thin layers of butter, 160 mm wide and 10 mm thick, was continuously discharged at the speed of 3 mm per second. When the material was fed under the press roller 17, the strip of material with smooth surfaces, 200 mm wide and 6.6 mm thick, was continuously produced at the speed of 6 mm per second.

I claim:

1. A process for the continuous production of multilayered food product from a plurality of substantially spherical materials each comprising an outer layer of dough and a filling encrusted by said dough; the process including feeding said materials onto a movable base, one upon the other, said movable base being movable in one direction to convey said materials from the feeding location to another location for further processing; and compressing said materials upon feeding each material upon said movable base and before the feeding of a subsequent material, using a descendable press platen positioned above the movable base.

2. A process according to claim 1 wherein the base is constantly moving during production and wherein the number of layers is freely adjusted by varying the velocity of the base.

3. A process according to claim 1 which consists of moving the base continuously at a speed which is regulated so that the distance of the movement of the base is one-half of the diameter or less of the compressed material for each interval of time between the feeding of a material and the feeding of subsequent material.

4. A process according to claim 1 which consists of moving the base intermittently and feeding and compressing a plurality of said materials, one upon the other, while said base is stationary, so as to permit the production of multilayered material.

5. A process according to claim 1, in which the compressed material is rolled up into a convulute bar by means of a stationary chain belt and a moving belt.

6. A process according to claim 1, in which the compressed material is re-compressed by a press roller.

7. A process according to claim 6, in which the compressed material is cut to a predetermined length by means of cutter teeth on the press roller.

* * * * *